United States Patent [19]

Yaple

[11] Patent Number: 5,358,265

[45] Date of Patent: Oct. 25, 1994

[54] MOTORCYCLE LIFT STAND AND ACTUATOR

[76] Inventor: Winfred E. Yaple, 6428 Pepperdine, NE., Albuquerque, N. Mex. 87111

[21] Appl. No.: 103,427

[22] Filed: Aug. 5, 1993

Related U.S. Application Data

[63] Continuation-in-part of Ser. No. 880,169, May 6, 1992, Pat. No. 5,234,225, and a continuation-in-part of Ser. No. 567,256, Aug. 13, 1990, Pat. No. 5,118,126.

[51] Int. Cl.$^5$ ............................................. B62H 1/06
[52] U.S. Cl. ..................................... 280/293; 280/303; 280/304; 74/424.8 R; 74/459
[58] Field of Search ............... 280/293, 298, 299, 300, 280/301, 302, 303, 304; 74/424.8 R, 424.8 NA, 438, 441, 459

[56] References Cited

U.S. PATENT DOCUMENTS

| | | | |
|---|---|---|---|
| 1,039,838 | 10/1912 | Steinberger | 280/299 |
| 1,254,624 | 1/1918 | Betts et al. | 280/299 |
| 2,450,282 | 9/1948 | Jackson | 74/459 |
| 2,835,499 | 2/1955 | Andrén et al. | 280/8 |
| 2,842,007 | 7/1958 | Brant | 74/441 |
| 2,975,649 | 5/1989 | Propst | 74/424.8 |
| 3,068,714 | 12/1962 | Davis | 74/459 |
| 3,198,546 | 8/1965 | Hopkins | 280/303 |
| 3,404,580 | 10/1968 | Valenti | 74/424.8 R |
| 3,404,581 | 4/1967 | Kraus | 74/424.8 |
| 3,537,666 | 3/1969 | Lewis | 242/107 |
| 3,998,470 | 12/1976 | Houston | 280/301 |
| 4,133,402 | 1/1979 | Soo Hoo | 180/30 |
| 4,223,906 | 9/1980 | Gratza | 280/301 |
| 4,432,562 | 2/1984 | Cline | 280/300 |
| 4,474,387 | 10/1984 | Maranell | 280/293 |
| 4,513,837 | 4/1985 | Archer | 180/209 |
| 4,521,031 | 6/1985 | Huth | 280/293 |
| 4,580,804 | 4/1986 | Weber | 280/300 |
| 4,582,336 | 4/1986 | Onoda | 280/293 |
| 4,625,987 | 12/1986 | Marsh | 280/293 |
| 4,660,847 | 4/1987 | Yagasaki | 280/298 |
| 4,671,374 | 6/1987 | Kouyama et al. | 280/301 |
| 4,693,488 | 9/1987 | Bernocco | 280/293 |
| 4,817,977 | 4/1989 | Bookbinder | 74/424.8 R |
| 4,961,477 | 10/1990 | Sweeney | 280/303 |
| 5,067,739 | 11/1991 | Kuan | 280/304 |
| 5,118,126 | 6/1992 | Yaple | 280/293 |
| 5,234,225 | 8/1993 | Yaple | 280/293 |

FOREIGN PATENT DOCUMENTS

| | | | |
|---|---|---|---|
| 280268 | 3/1967 | Australia | 280/293 |
| 101233A | 2/1984 | European Pat. Off. | 280/293 |
| 3401740A | 7/1985 | Fed. Rep. of Germany | 280/302 |
| 242203A | 1/1987 | Fed. Rep. of Germany | 280/293 |
| 756515 | 9/1933 | France | 280/301 |
| 240385 | 9/1989 | Japan | 280/304 |
| 1-262272 | 10/1989 | Japan | 280/293 |
| 2-3585 | 1/1990 | Japan | 280/293 |
| 122719 | 10/1926 | Sweden | 280/293 |
| 261071 | 8/1970 | U.S.S.R. | |
| 2124987A | 2/1984 | United Kingdom | 280/293 |
| 84/00337 | 2/1984 | World Int. Prop. O. | 280/293 |

OTHER PUBLICATIONS

Nook Industries, "ACTIONJAC Electric Cylinder Jacs Worm Gear Screw Jacs", p. 403 (©1991).

Nook Industries, "ACTIONJAC Metric Power Cylinders T-Series Multi-Series", p. 43 (©1991).

Nook Industries, "POWERAC Design Guide Acme Screws Acme Nuts/Mounting Flanges", p. 39 (©1992).

Nook Industries, "POWERTRAC Design Guide", p. 71 (©1992).

Nook Industries, "POWERTRAX Linear Motor Design Guide", p. 31 (©1992).

*Primary Examiner*—Kenneth R. Rice
*Assistant Examiner*—Kevin Hurley
*Attorney, Agent, or Firm*—Donovan F. Duggan; Deborah A. Peacock

[57] ABSTRACT

Disclosed is an improved automatically actuated motorcycle lift stand. The stand comprises upper and lower stand units on each side of the motorcycle. This configuration enables independent raising of the motorcycle when resting on either side, as well as providing a normal parking function. Also disclosed is an improved linear actuator comprising a plurality of concentric telescoping members. Two embodiments of single groove ball return elements are disclosed.

30 Claims, 4 Drawing Sheets

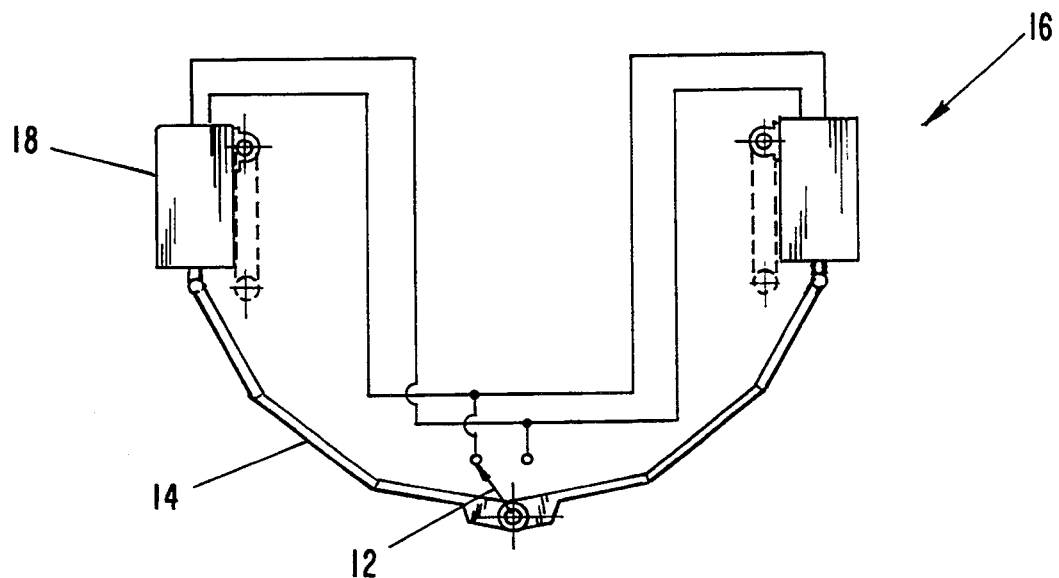
FIG—3
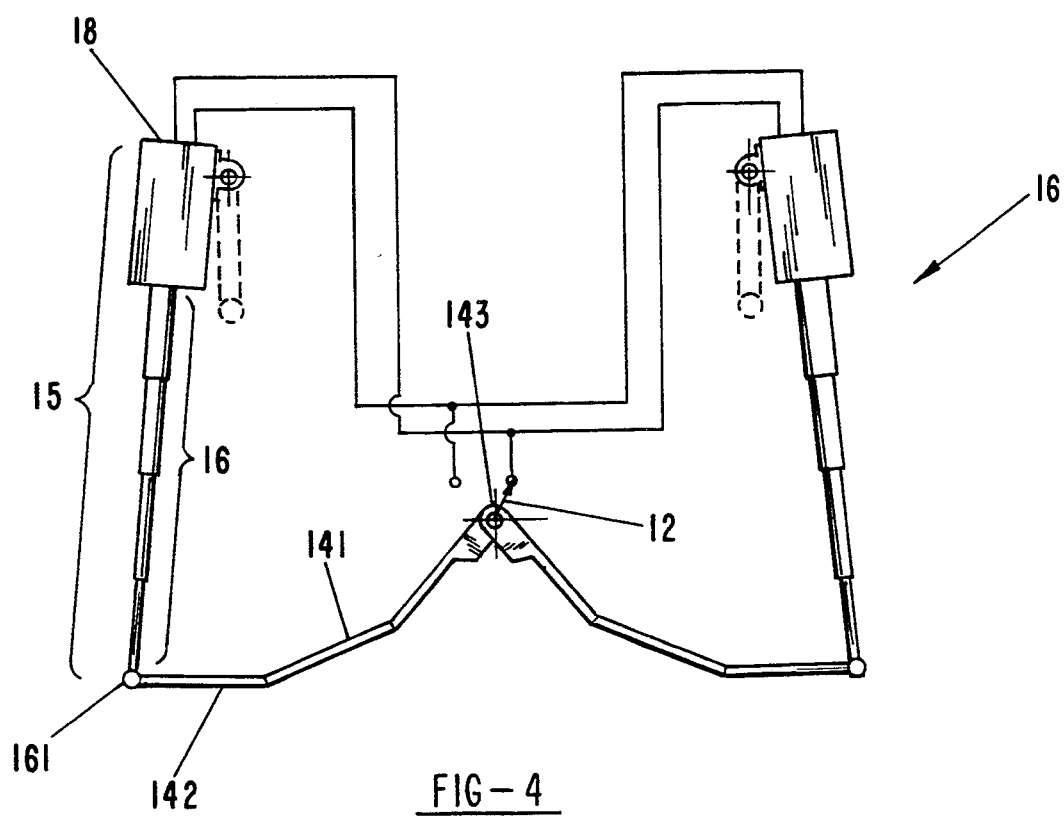
FIG—4

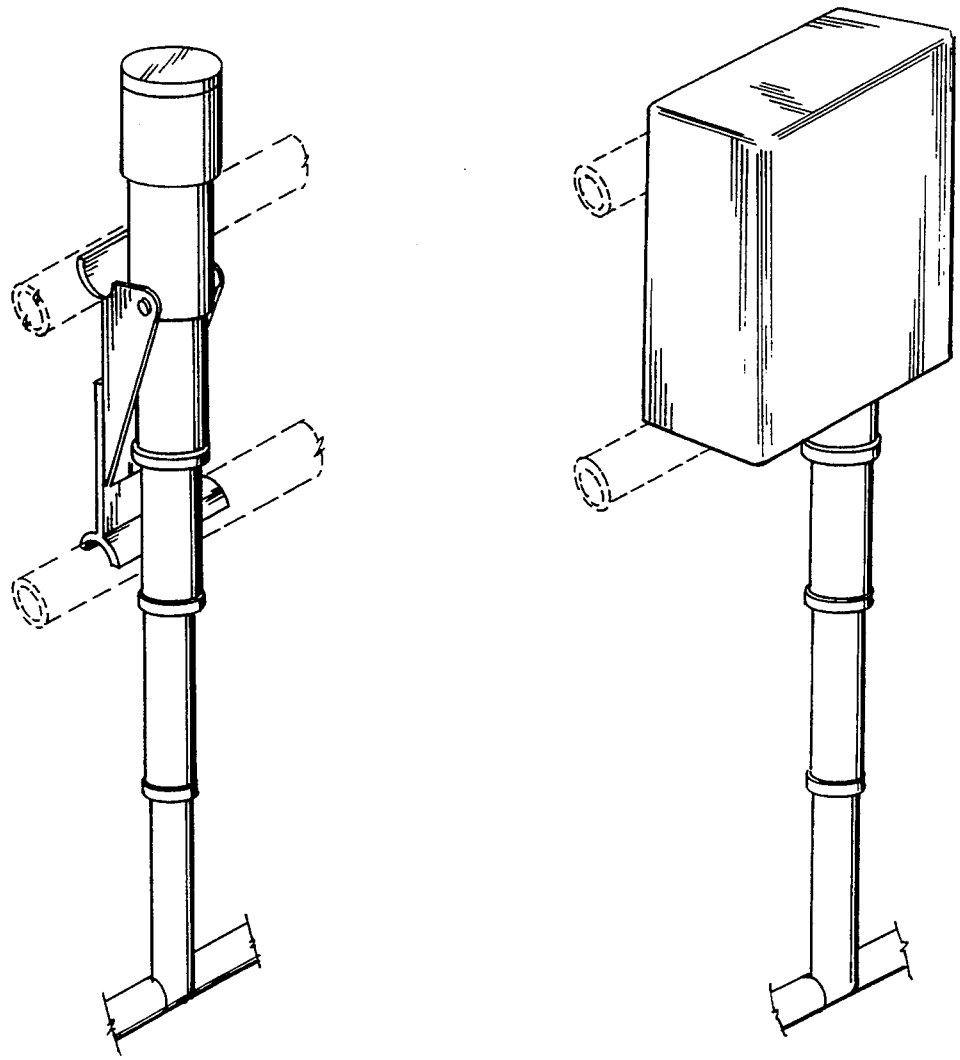
FIG-8
FIG-9
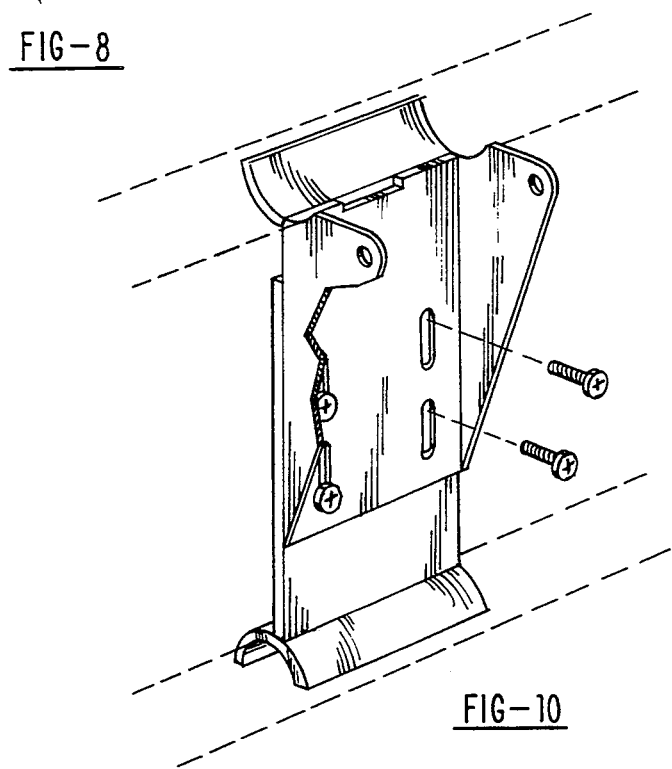
FIG-10

MOTORCYCLE LIFT STAND AND ACTUATOR

CROSS-REFERENCE TO RELATED APPLICATIONS

This application is a continuation-in-part application of U.S. patent application Ser. No. 07/880,169, filed May 6, 1992, and issuing as U.S. Pat. No. 5,234,225 on Aug. 10, 1993, in turn a continuation-in-part application of U.S. patent application Ser. No. 07/567,256, filed Aug. 13, 1990, now U.S. Pat. No. 5,118,256, issued Jun. 2, 1992, the teachings of which are incorporated herein by reference.

BACKGROUND OF THE INVENTION

1. Field of the Invention (Technical Field)

The present invention relates to an improved automatically extendable and retractable center stand for motorcycles, an improved linear actuator, and methods for using such stand and actuator.

2. Background Art

Stands for motorcycles are essential in parking the motorcycles. The well known side-mounted "kick" stand, although expedient and easy to operate, presents only one-point surface contact. On ground surfaces comprising soft sand, hot asphalt, oil slicks, or the like, the likelihood of upsetting the motorcycle is great.

Center stands for motorcycles offer an alternative parking mechanism to motorcycle riders. However, although the center stand offers a more stable two-point surface contact, it can be cumbersome and difficult to operate. The center stand must be pressed against the ground surface by overcoming an upwardly-exerted spring force (usually by standing on it), while the motorcycle is rocked backwardly, using the stand as a fulcrum. This involves strength and agility not possessed by all riders. Also the rider must dismount the motorcycle in order to engage the center stand. In view of the fact that many of today's fully equipped touring motorcycles weigh upwards of 800 pounds, many riders will opt to use the easily engaged, less stable side stand. Concomitantly, the more stable center stand is used only rarely, if at all.

Center stands are disclosed in the following references. U.S. Pat. No. 1,039,838, to Steinberger, entitled, "Motor Cycle Stand," discloses a rear wheel mounted center stand, apparently manually extended, which is retracted and locked into the traveling position by forward motion of the motorcycle.

U.S. Pat. No. 4,432,562, to Cline, entitled, "Motorcycle Jack Stand" and U.S. Pat. No. 4,580,804, to Weber, entitled, "Jack Stand for Motorcycles" apparently both teach motorcycle center stand structures wherein the legs of the stand are manually (or pedally) pivoted downwardly and then telescopically extended.

U.S. Pat. No. 4,693,488, to Bernocco, entitled, "Electrically Controlled Motorcycle Stand" discloses a center stand structure rotatable downwardly into the operative position by an electric motor and gear assembly.

U.S. Pat. No. 4,513,837 to Archer, entitled, "Motorcycle with Outrigger Wheels" discloses hydraulically or pneumatically actuated outrigger wheels to provide lateral support.

U.S. Pat. No. 4,660,847 to Yagasaki, entitled, "Main Stand Device for Two-Wheeled Motorcycle" teaches a center stand structure manually rotatable downwardly having a motor-driven telescoping leg.

Another motorcycle lift stand of interest is that disclosed in Japanese reference 1-262272, entitled "Stay Stand Device for Motorcycle", to Fujita, which teaches a stand initially driven by manual force, then motor driven to an upright position.

Japanese reference 2-3585, entitled "Auxiliary Wheel Device for Motorcycle", to Uehara discloses a drive circuit for adjusting the height of "training wheels" on a motorcycle.

German reference DE 3401740A1 entitled "Parking Stand for Motor Cycles" to Hanle, discloses a spindle-driven stand for motorcycles.

U.S. Pat. No. 4,693,488, entitled "Electrically Controlled Motorcycle Stand", to Bernocco, discloses a pinion-gear driven motorcycle stand.

Perhaps most relevant is Australian reference 280,268, to Harrison, entitled "Improvements in Two-Wheeled Motor Vehicles". This reference discloses a spring actuated bilaterally-mounted motorcycle lift stand which provides motorcycle re-erection from whichever side it rests, as well as providing a normal parking stand capability. This reference, however, teaches only direct spring actuation; such spring only being compressed by hydraulic pressure.

The prior art is also replete with ball screw linear actuators. Such actuators normally consist of threaded co-acting concentric telescoped relatively rotating members having a plurality of balls therebetween. Relative rotation between members results in linear translation of the members.

U.S. Pat. No. 3,404,580, to Valenti, entitled "Ball Screw Actuator", discloses a ball screw linear actuator having a plurality of concentric members. However, the ball recirculating tubes are external of the member, thereby resulting in larger, nonuniform diameters of such members.

U.S. Pat. No. 3,404,581, to Kraus, entitled "Ball Screw Actuator" discloses similar structure.

U.S. Pat. No. 2,975,649, to Propst, entitled "Ball Screw Assembly with Internal Ball Return"; U.S. Pat. No. 3,068,714, to Davis, entitled "Nut and Screw Drive Device of the Recirculating Ball Type"; and U.S. Pat. No. 3,537,666, to Lewis, entitled "Retractor for Seatbelts and the Like"; all teach two-member ball screw linear actuator structure with internal ball return tubes or channels.

Soviet Union Patent No. 261071 discloses a single recirculating groove for a ball screw linear actuator having two coacting members.

None of the cited ball screw actuator patents, however, disclose at least three coacting telescoped members, the intermediate member having both an internally grooved portion and a single externally grooved ball recirculating portion. Nor, of course, does the prior art teach the use of a plurality of such ball screw actuators in a motorcycle lift stand.

SUMMARY OF THE INVENTION (DISCLOSURE OF THE INVENTION)

In accordance with the present invention there is provided a motorcycle lift stand comprising an upper stand unit mounted upon respective sides of a motorcycle. The upper stand unit comprises a drive unit and linear actuators driven by the drive unit. The linear actuators further comprise rotary-to-linear motion conversion mechanisms. A lower stand unit is pivotally mounted for movement between a retracted position and ground contactable position by the linear actuators.

The upper stand units further comprise reduction gears, limit switches, and may comprise encoders. The invention further comprises upper stand units and lower stand units upon the other respective side of the motorcycle.

The linear actuators may comprise ball screw linear actuators. The ball screw linear actuators comprise an internally threaded cylindrical portion and an externally threaded ball recirculation portion of constant outer diameter and ball retention structure. The ball retention structure comprises groove overhangs or multilateral grooves of variable depth.

The linear actuator of the invention further comprises a plurality of nested telescoped concentric actuator members, wherein at least one of the actuator member comprises an internally threaded member and at least one other of the actuator members comprises a ball recirculation member. The linear actuators further comprise an intermediate actuator telescoped between the at least one actuator member and the at least one other actuator member. The ball recirculation member comprises an external single start ball retaining groove comprising a plurality of balls in the ball retaining groove. The ball retaining groove comprises ball retention structure comprising groove overhang structure or variable depth groove structure having a multilateral angled configuration.

In accordance with the present invention there is also provided linear ball screw actuator apparatus comprising a plurality of concentric telescoped actuator elements. At least one of the actuator elements comprises a threaded cylindrical member and at least one other of the actuator elements comprises a threaded ball recirculation member. That at least one other actuator member is telescoped concentrically within the at least one actuator element for relative rotation. Relative rotation between the concentric actuator elements results in linear translation of the concentric actuator elements. The invention further comprises at least one intermediate actuator element concentrically nested within the at least one actuator element. At least one other actuator element is concentrically nested within the at least one intermediate actuator element. The intermediate actuator element comprises both an internally threaded cylindrical member and a single start externally threaded ball recirculation mechanism of constant outer diameter and variable depth.

In accordance with the present invention there is also provided a method of using a motorcycle stand comprising the steps of mounting upper and lower stand units on both sides of a motorcycle, actuating the upper stand units, extending a plurality of linear actuators, and thereby pivoting the lower stand units into ground contact. The method further comprises the step of selectively actuating an upper stand unit on a given side of the motorcycle, as well as providing a plurality of nested concentric linear actuators. The step of actuating the upper stand units further comprises the step of actuating both upper stand units simultaneously or pivoting a single lower stand unit into ground contact.

A primary object of the present invention is the provision of an automatic lift stand for motorcycles possessing a motorcycle uprighting capability as well as a parking capability;

Another object of the invention is the provision of an improved linear actuator for a motorcycle lift stand.

A further object of the invention is the provision of an automatic lift stand for motorcycles which can selectively raise a motorcycle resting on either side to an upright, parked position;

Still another object of the invention is the provision of a ball screw linear actuator with at least three telescoping members;

Yet another object of the invention is the provision of a ball screw linear actuator having an intermediate member with both an internally threaded portion and a single groove, externally threaded drive and ball recirculating portion;

An advantage of the invention is its ease of assembly and operation;

Another advantage of the invention is the provision of a linear actuator with the same or counterrotating capability.

Still another advantage of the invention is the provision of a linear actuator with telescoping concentric members not requiring additional length at the bottom of the actuator;

Yet another advantage of the invention is the retention and recirculation of balls within a single groove;

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3 shows a front view of the lift stand fully retracted;

FIG. 4 shows a front view of the lift stand fully extended;

FIG. 8 shows another embodiment of the lift stand showing the securing structure;

FIG. 9 shows the cover structure of the upper stand units; and

FIG. 10 shows the securement of the triangular gussets to the brackets of the securing structure.

DESCRIPTION OF THE PREFERRED EMBODIMENTS

BEST MODES FOR CARRYING OUT THE INVENTION

Figure 1:
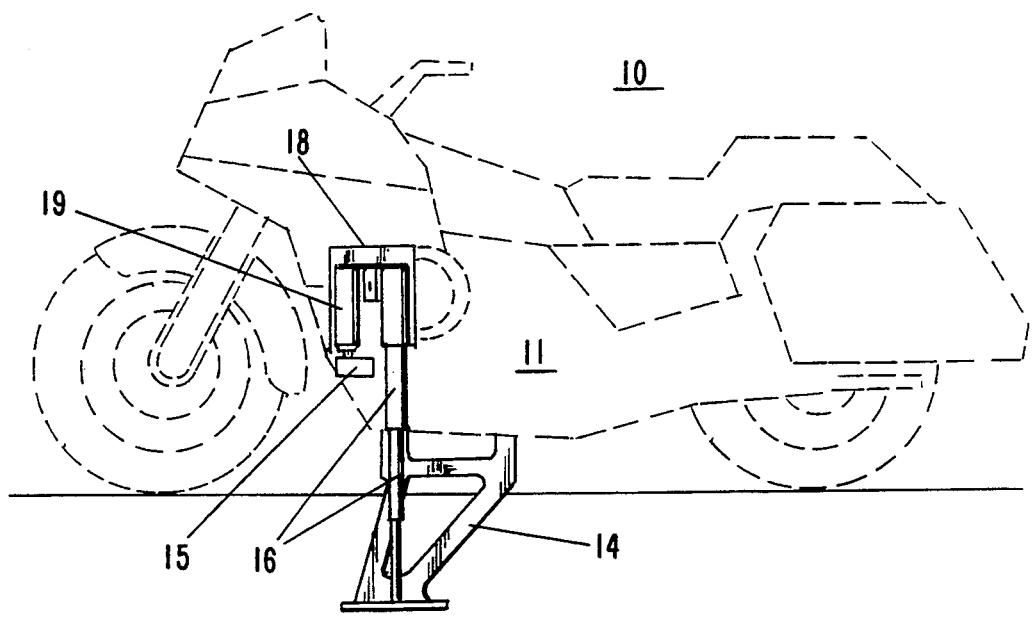
FIG. 1 is a side view of a motorcycle showing one embodiment of lift stand fully extended.
Figure 2:
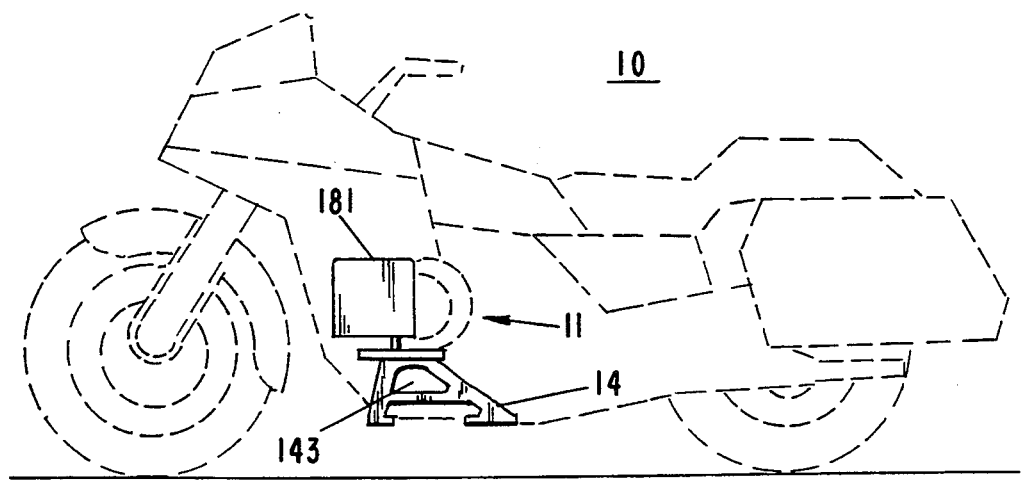
FIG. 2 is a side view of a motorcycle showing the same embodiment of lift stand fully retracted.

Reference is now made to FIGS. 1–4 of the drawings which show a preferred embodiment of an automated motorcycle center stand in accordance with the invention. As seen therein disposed on a motorcycle 10 is a center stand assembly 11 pivotally secured to the main frame or chassis of the motorcycle. Center stand assembly 11 comprises lower stand units 14, and upper stand units 15. Upper stand units 15 comprise linear actuators 16, and drive units 18. Right and left side components of the automated center stand are mirror images of each other, and are otherwise identical structurally and functionally.

In the preferred embodiment of the invention, upper stand units 15 are supported by triangular gussets 20 secured to brackets 24 and to engine guard bars 22, as shown in FIGS. 8 and 10.

In the preferred embodiment, as shown in FIGS. 8 and 10, gussets 20 are welded, bronzed, bolted, and screwed or otherwise immovably mounted on brackets 24. Brackets 24 comprise plates with cylindrical portions 26 thereon which engage engine guard bars 22. Brackets 24 are spread apart and secured together by tightening bolts, screws, and the like, thereby securing brackets 24 and gussets 20 to engine guard bars 22. Mounting in this manner provides fore-and-aft adjustment and positioning of gussets 20, parallel to the longitudinal axis of the motorcycle, enabling accurate positioning of linear actuators 16 in any desired longitudinal position relative to the motorcycle.

In the preferred embodiment, as shown in FIGS. 1–4, drive units 18 of upper stand units 15 comprise a small DC motor 19, typically 1/15 to 1/20 HP. Drive units 18 also comprise reduction gearing (17) between motors 19 and linear actuators 16. Brakes (not shown) are also provided in linear actuators 16 to prevent rotation thereof upon cessation of drive power. Such brakes may be centrifugally actuated, solenoid actuated or any other brake mechanism known to the art. Electric circuitry components comprising on-off switching components, limit switches 12, and a limit switch actuator are also provided (also not shown). Those ordinarily skilled in the art will appreciate that other drive mechanisms may be used, for example, hydraulic actuators, as taught in parent application Ser. No. 07/880,169, filed May 6, 1992, now U.S. Pat. No. 5,234,225, and Ser. No. 07/567,256 filed Aug. 13, 1990, now Pat. No. 5,118,126. Other possible drive mechanisms might include linear electric motors, spring motors, pneumatic motors, and mechanical linkages powered directly by the motorcycle engine or transmission. Removable cover 181, shown in FIG. 9, is provided for shielding drive units 18 as well as providing an attractive fairing for drive units 18.

Alternatively, instead of limit switches 12, encoder devices 15 could be employed to signal extension and retraction of linear actuators 16. Other equivalent signal, sensor and control circuitry known to those ordinarily skilled in the art may be employed. For example, instead of individually actuable drive units (for righting a motorcycle on a given side), such drive units may be connected and controlled to selectively energize one or both drive units as required.

FIG. 8 also illustrates an alternate embodiment of upper stand unit 15. In this embodiment drive motors 19a are axially and concentrically positioned directly above linear actuator 16. Brakes and reduction gearing (not shown) are interposed between drive motors 19a and linear actuators 16. Electric control components, as in the preferred embodiment, are also provided. This configuration results in a more compact upper stand unit by eliminating the side-by-side drive unit configuration of FIG. 1.

In the preferred embodiment as shown in FIGS. 2–5, lower stand units 14 comprise legs 141 and feet or foot portions 142. In the preferred embodiment, legs 141 are preferably ¼" thick steel with cutouts 143 to reduce weight. Legs 141 are preferably variable in shape to conform to the body shape of a given motorcycle; for example, with a Honda Gold Wing ®, the legs present an inverted gull wing configuration. Further, using the Gold Wing ® example, legs 141 may be 34" wide and may subtend a 25° angle between leg portions. Other shape parameters will be used for other motorcycle models.

Lower stand units 14 as shown in FIGS. 2–5 further comprise feet, or foot portions 142. In the preferred embodiment the outboard portions of feet 142 are cylindrical and surround linear actuator ends 161. This configuration provides relative rotation of linear actuator ends 161 and feet 142 during extension and retraction of linear actuators 16 thereby spreading a selected leg or legs 141 outwardly. In addition to rotating about linear actuator end 161 legs 14 also pivot about chassis-mounted pivot 143. Such outward extension of legs 141 erects motorcycle 10 from an inclined position on either side to an upright, parked position as well as upwardly lifting and parking the motorcycle from a normal, upright position.

Figure 5:
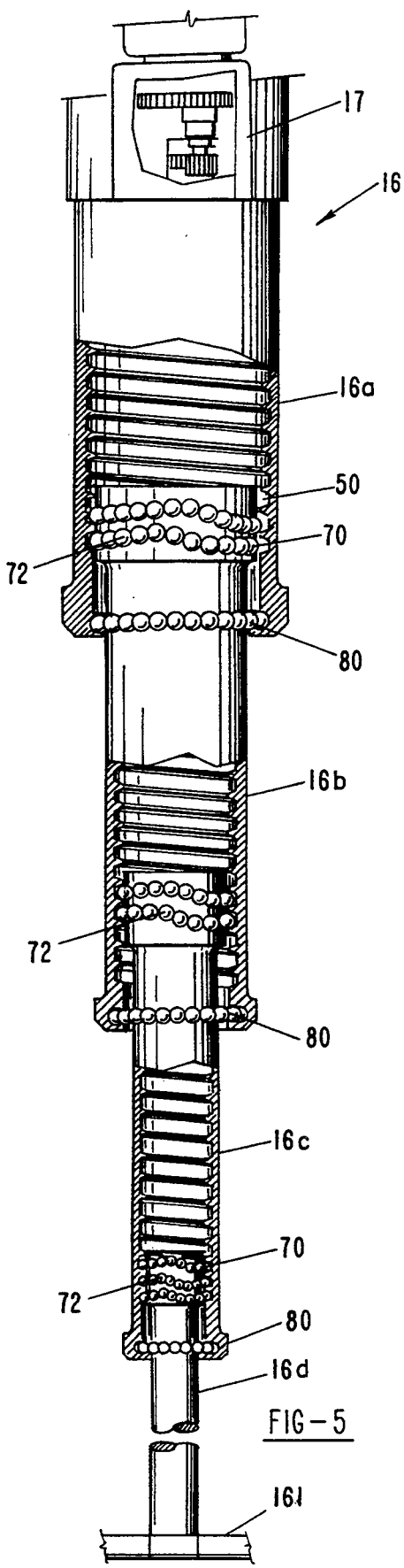
FIG. 5 shows a cutaway view of the ball screw actuators fully extended.

FIGS. 5–7c show the preferred linear actuator of the invention. As best shown in FIG. 5, linear actuator 16 comprises at least three actuator members: 16a, 16b, 16c and 16d. Actuator members are concentrically telescoped and coaxially nested within each other. Topmost member 16a is directly driven by reduction gearing in drive unit 18. Member 16a comprises an internally threaded or grooved cylinder surrounding intermediate member 16b. Internal thread or groove 50 extends the entire length of member 16a. Member 16b and 16c, also cylindrical, also comprise internal threads or grooves 50. Additionally, members 16b, 16c and 16d also comprise externally threaded grooves 69 and drive and ball recirculation portions 70. All members further comprise conventional ball bearing races 80, which in addition to performing a journal function, also act as stops for limiting linear motion.

Figure 7A:
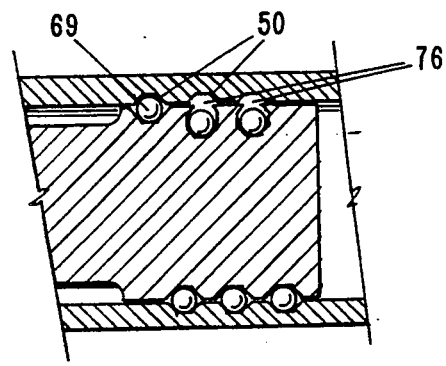
FIG. 7a shows a cross-section of the recirculation portion of one embodiment of ball screw actuators.
Figure 7B:
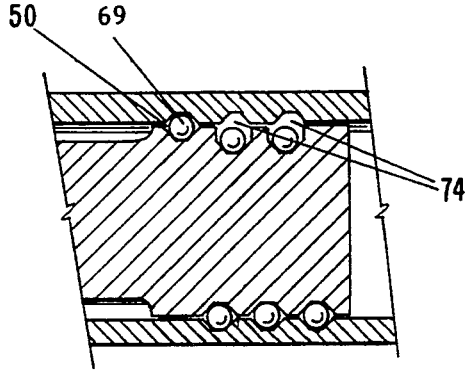
FIG. 7b shows a cross-section of the recirculation portion of another embodiment of ball screw actuator fully extended.
Figure 7C:
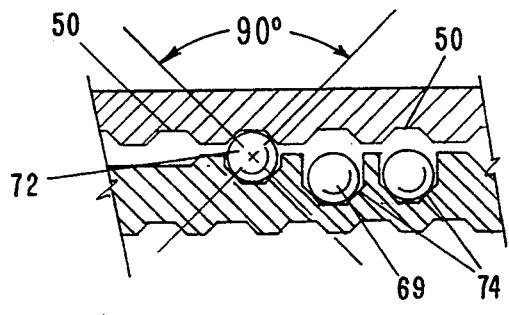
FIG. 7c shows a detailed cross-section of the groove and ball configuration in the recirculating portions of the ball screw actuators.

As best shown in FIG. 7c, internal and external threads or grooves 50 and 69, respectively, comprise a 90° groove (45° sloping groove walls with a flat bottom portion). Threads or grooves 50 coact with balls 72 and grooves 69 to convert rotary motion of the member to linear transactional movement of the members, as in conventional ball screw linear actuators, which in addition to performing a journal function also act as stops for limiting linear motion.

Figure 6:
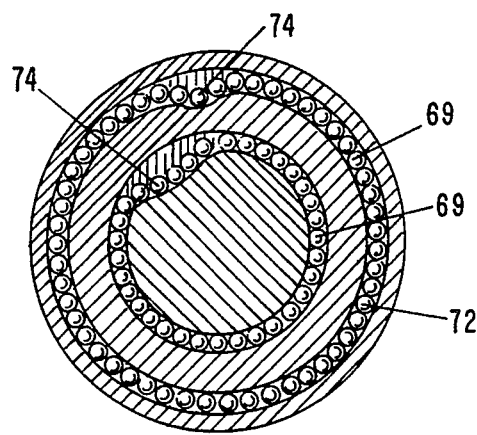
FIG. 6 shows a cross-section of a ball screw actuator.

Drive and ball recirculating portion 70 uniquely provides drive and ball recirculating functions without external ball return tubes, internal ducts or the like. As best shown in FIGS. 6–7c, the preferred embodiment of drive and ball recirculation portion 70 also comprises single groove 69. Groove 69 comprises vertical wall portions, 45° downward sloping portions and flat bottom portion, resulting in a multilaterally grooved, angled configuration. Preferably, the ratio of depth of groove 50 to groove 69 is 1:2. This configuration results in a substantially reduced wall thickness, only 25–30% more thickness than the ball diameter.

Drive and ball recirculation portion 70 also comprises an offset, connecting grooved portion 74 of sufficient depth that is deeper than the remainder of groove 69 to totally envelop balls 72. Projection of balls 72 beyond the circumference of actuator members 16 would result in binding. Balls 72 "cross over" and are recirculated in offset, deeper grooved portion 74.

Actuator rod member 16d is the bottommost and innermost member of the linear actuator, and preferably comprises hardened chrome steel, stainless steel, bronze, or any other material of suitable hardness and strength. Actuator rod member comprises drive and ball recirculation portion 70 at one end, while opposite end 161 is the load bearing end. End 161 pivotally or rotationally connects to foot portions 142 of lower stand unit 14.

The unique groove configurations of coacting internal, grooves 50 and externally grooved drive and ball recirculation portions 70 entrain and retain balls 72 therewithin. With the exception of offset recirculation portion 74, portions of balls 72 are respectively entrained in grooves 50 and 69 in a depth ratio of 1:2, as shown in FIG. 7c.

FIG. 7a illustrates an alternate drive and recirculating portion. Similar in all other respects to FIGS. 7b and 7c, the FIG. 7a drive and ball recirculation embodiment further comprise ball retention means 76. Ball retention means comprise overhanging portions over groove 69, thereby ensuring that balls 72 do not project beyond the periphery of the member.

Numerous variations and modifications will occur to those ordinarily skilled in the art. Relative rotation between actuator members may be counterrotational or in the same direction. Further, any desired number of actuator members may be used consistent with friction demands, application requirements, lubrication limitations, seal requirements and the like. Grooves 50 and 69 are normally single start but may be right or left handed. Pitch and lead may be varied, as well as the dimensions of the actuator members themselves, including but not limited to length, diameter, threads per inch, and the like.

In operation, either or both upper stand units 15 may be actuated. For example, if the motorcycle 10 were recumbent upon a given side, actuation of upper stand unit 15 on that side would restore the motorcycle to an upright position. In such operation, actuation of drive unit 18 would extend the plurality of linear actuators 16, thereby ultimately pivoting the appropriate portion of lower stand unit 14 into ground contact, thereby levering and raising motorcycle 10 to an upright position.

Further actuation of both upper stand units 15 on each side of the motorcycle would further elevate motorcycle 10 to the parked position.

Full extension of linear actuators 16 is sensed by a limit switch, an encoder device or the like, and drive power is thereby terminated. The internal brake sets and linear actuators 16 and lower stand unit 14 are firmly and nonrotationally positioned in ground contact. Retraction of linear actuators 16 and lower stand unit 14 is accomplished by driving the upper stand unit in the opposite direction, thereby linearly retracting linear actuators 16 and pivoting lower stand unit 14, as a portion thereof, out of ground contact.

The linear actuators of the present invention can also be used with other motorcycle lift stands, including but not limited to those disclosed in U.S. Pat. Nos. 5,234,225 and 5,118,126, to Yaple.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A motorcycle stand comprising:
   upper stand unit means mounted upon a respective side of a motorcycle;
   said upper stand unit means comprising drive unit means and linear actuator means driven by said drive unit means;
   said linear actuator means further comprising rotary-to-linear motion conversion means;
   lower stand unit means pivotally mounted for movement between a retracted position and a ground contactable position by said linear actuator means; and
   said motorcycle stand further comprising encoder means.

2. The invention of claim 1 wherein said upper stand unit means further comprises reduction gear means.

3. The invention of claim 1 wherein said upper stand unit means further comprises limit switch means.

4. The invention of claim 1 wherein said lower stand unit means in the retracted position conforms to the body shape of the motorcycle.

5. The invention of claim 1 further comprising upper stand unit means and lower stand unit means mounted upon the other respective side of said motorcycle.

6. The invention of claim 1 wherein said linear actuator means comprises ball screw linear actuator means.

7. The invention of claim 6 wherein said ball screw linear actuator means comprises an internally threaded cylindrical portion and an externally threaded ball recirculation portion of constant outer diameter.

8. The invention of claim 7 wherein said externally threaded ball recirculation means of constant outer diameter further comprises ball retention means.

9. The invention of claim 8 wherein said ball retention means comprises groove overhang means.

10. The invention of claim 8 wherein said ball retention means comprises multilateral groove means of variable depth.

11. The invention of claim 1 wherein said linear actuator means further comprises a plurality of nested telescoped concentric actuator member means.

12. The invention of claim 11 wherein at least one of said actuator members means comprises an internally threaded member.

13. The invention of claim 11 wherein at least one other of said actuator member means comprise ball recirculation member means.

14. The invention of claim 11 further comprising an intermediate actuator member telescoped between at least one actuator member and at least one other actuator member.

15. The invention of claim 13 wherein said ball recirculation member means comprises external single start ball retaining groove means.

16. The invention of claim 15 comprising a plurality of balls in said ball retaining groove.

17. The invention of claim 9 wherein said ball retaining groove means comprises ball retention means.

18. The invention of claim 17 wherein said ball retention means comprises groove overhang means.

19. The invention of claim 17 wherein said ball retention means comprises variable depth groove means.

20. The invention of claim 19 wherein said variable depth groove means comprises a multilateral angled configuration.

21. Linear ball screw actuator apparatus comprising:
a plurality of concentric-telescoped actuator element means;
at least one of said actuator elements means comprising threaded cylindrical member means;
at least two of said actuator elements comprising threaded ball recirculation means of constant outer diameter and variable depth;
at least one other actuator element means being telescoped concentrically within said at least one actuator element means for relative rotation therewith; and
wherein relative rotation between said concentric actuator element means results in linear translation of said concentric actuator element means.

22. The invention of claim 21 further comprising at least one intermediate actuator element means concentrically nested within said at least one actuator element means for relative rotation therewith.

23. The invention of claim 22 wherein said at least one other actuator element means is concentrically nested within said at least one intermediate actuator element means for relative rotation therewith.

24. The invention of claim 23 wherein said intermediate actuator element means comprises both internally threaded cylindrical member means and single start externally threaded ball recirculation means of constant outer diameter and variable depth.

25. A method of using a motorcycle stand, said stand comprising a plurality of upper and lower stand units, each said upper stand unit being pivotally connected to a lower stand unit and comprising a plurality of nested concentric linear actuators, said method comprising the steps of:
   a) mounting the upper and lower stand units on both sides of a motorcycle;
   b) actuating the upper stand units by extending the plurality of nested concentric linear actuators;
   c) thereby pivoting the lower stand units into ground contact.

26. The method of claim 25 further comprising the step of selectively actuating an upper stand unit on a given side of the motorcycle.

27. The method of claim 25 wherein the step of mounting upper and lower stand units further comprises the step of providing a plurality of nested concentric linear actuators.

28. The method of claim 25 wherein the step of actuating the upper stand units further comprises the step of actuating both upper stand units simultaneously.

29. The method of claims 26 wherein the step of selectively actuating an upper stand unit further comprises the step of pivoting a single lower stand unit into ground contact.

30. The method of claim 25 comprising the step of pivoting the lower stand units into the retracted position thereby conforming the lower stand units to the body shape of the motorcycle.

* * * * *